United States Patent
Balling et al.

(10) Patent No.: US 10,781,831 B2
(45) Date of Patent: Sep. 22, 2020

(54) SWITCH VALVE FOR CONTROLLING A HYDRAULIC FLUID FLOW AND CONNECTING ROD WITH THE SWITCH VALVE

(71) Applicant: ECO Holding 1 Gmbh, Marktheidenfeld (DE)

(72) Inventors: Manfred Balling, Würzburg (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 16/199,665

(22) Filed: Nov. 26, 2018

(65) Prior Publication Data

US 2019/0093679 A1 Mar. 28, 2019

Related U.S. Application Data

(63) Continuation of application No. PCT/EP2017/061619, filed on May 15, 2017.

(30) Foreign Application Priority Data

Jun. 1, 2016 (DE) .......... 10 2016 110 127
Aug. 11, 2016 (DE) .......... 10 2016 114 953

(51) Int. Cl.
*F15B 13/06* (2006.01)
*F02B 75/04* (2006.01)
(Continued)

(52) U.S. Cl.
CPC ............ *F15B 13/06* (2013.01); *F02B 75/045* (2013.01); *F16K 11/07* (2013.01); *F16K 11/0704* (2013.01); *F16K 31/003* (2013.01)

(58) Field of Classification Search
CPC ........ F15B 13/06; F02B 75/045; F16K 11/07; F16K 11/0704; F16K 31/003
(Continued)

(56) References Cited

U.S. PATENT DOCUMENTS 2,989,954 A 6/1961 Hulbert
4,522,373 A 6/1985 Clark
(Continued)

FOREIGN PATENT DOCUMENTS

DE 102012112461 A1 6/2014
DE 102013103685 A1 10/2014
(Continued)

*Primary Examiner* — Joseph J Dallo
*Assistant Examiner* — Yi-Kai Wang
(74) *Attorney, Agent, or Firm* — Von Rohrscheidt Patents

(57) ABSTRACT

A switch valve for controlling a hydraulic fluid flow, the switch valve comprising: a capture element that is arranged in a valve housing and that is displaceable into a first switching position or a second switching position and interlockable by a spring loaded interlocking element in the first switching position or the second switching position, wherein a first hydraulic connection is connected with a relief connection in the first switching position and a second hydraulic connection is connected with the relief connection in the second switching position, wherein a switching travel of the capture element is limited, wherein the interlocking element is at least partially arranged in a recess of the capture element, and wherein the valve housing includes a first groove that is oriented in an axial direction and limited in the axial direction wherein the interlocking element is arranged axially movable in the first groove.

16 Claims, 5 Drawing Sheets

(51) Int. Cl.
 *F16K 11/07* (2006.01)
 *F16K 31/00* (2006.01)

(58) Field of Classification Search
 USPC .......................................................... 123/48 B
 See application file for complete search history.

(56) References Cited

U.S. PATENT DOCUMENTS

| | | | | |
|---|---|---|---|---|
| 2010/0154896 | A1* | 6/2010 | Thrash, Jr. | E21B 33/06 |
| | | | | 137/112 |
| 2011/0126806 | A1* | 6/2011 | Lee | F02D 15/02 |
| | | | | 123/48 B |
| 2016/0215684 | A1* | 7/2016 | Hofmann | F04B 45/04 |
| 2016/0312713 | A1* | 10/2016 | Hutzelmann | F16C 7/06 |
| 2017/0002732 | A1* | 1/2017 | Paul | F02B 75/045 |

FOREIGN PATENT DOCUMENTS

| | | |
|---|---|---|
| DE | 102014116655 A1 | 5/2016 |
| DE | 102016201120 A1 | 7/2017 |

* cited by examiner

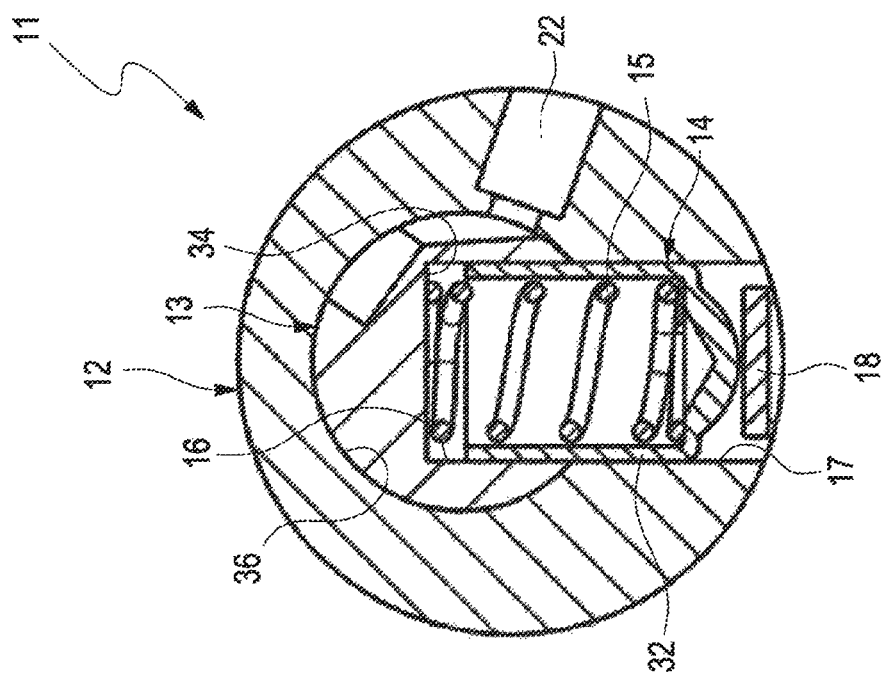
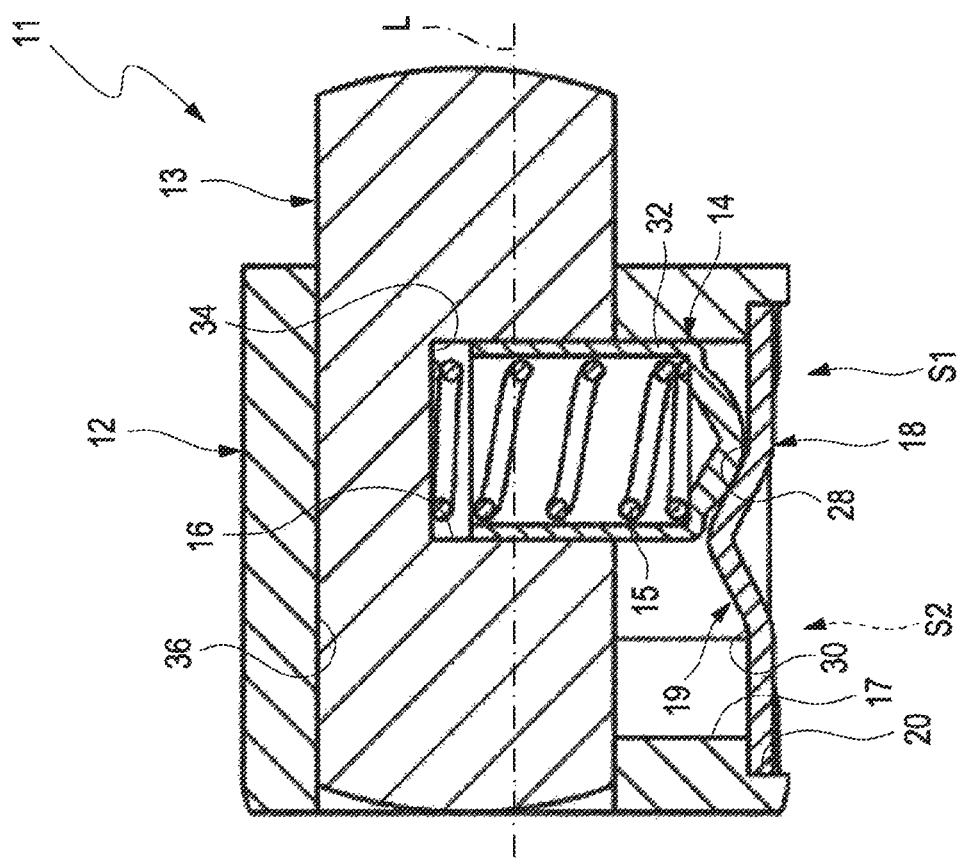

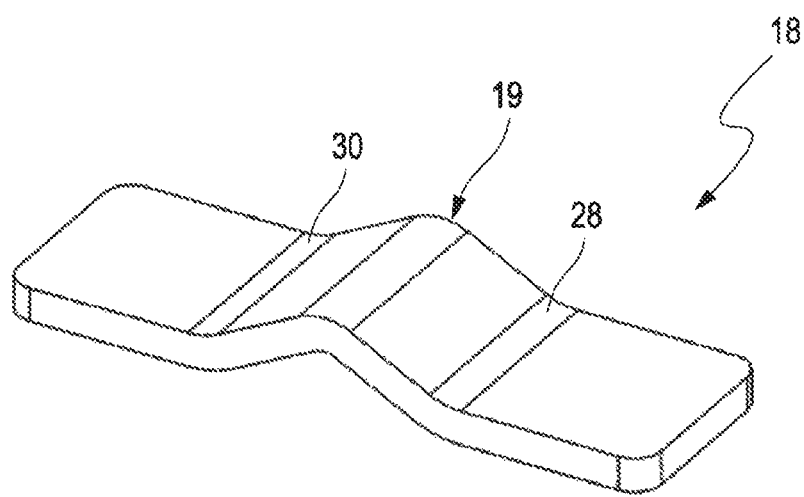
FIG. 7
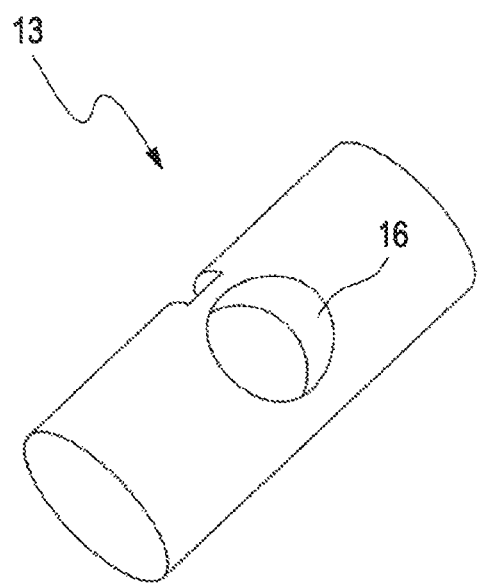    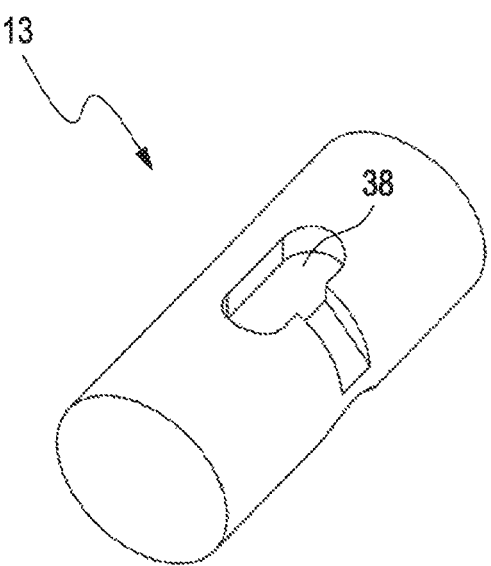
FIG. 8                FIG. 9

SWITCH VALVE FOR CONTROLLING A HYDRAULIC FLUID FLOW AND CONNECTING ROD WITH THE SWITCH VALVE

RELATED APPLICATIONS

This application is a continuation of international patent application PCT/EP2017/061619 filed on May 15, 2017 claiming priority from German patent application DE10 2016 110 127.3 filed on Jun. 1, 2016 and
DE10 2016 114 953.5 filed on Aug. 11, 2016,
all of which are incorporated in their entirety by this reference.

FIELD OF THE INVENTION

This invention relates to a switch valve for controlling a hydraulic fluid flow, in particular for a connecting rod for an internal combustion engine with variable compression including an eccentrical element adjustment arrangement for adjusting an effective connecting rod length. The invention furthermore relates to a connecting rod with the switch valve.

BACKGROUND OF THE INVENTION in internal combustion engines a high compression ratio has a positive effect upon an efficiency of the internal combustion engine. Compression ratio is typically defined as a ratio of an entire cylinder cavity before compression to a remaining cylinder cavity after compression. In internal combustion engines with external ignition, in particular gasoline engines that have a fixed compression ratio, the compression ratio, however, may only be selected high enough so that a so-called "knocking" of the internal combustion engine is prevented during full load operations. However, for much more prevalent partial load operations of the internal combustion engine, thus for a lower cylinder charge the compression ratio can be selected at a higher level without "knocking" occurring. The important partial load operations of an internal combustion engine can be improved when the compression ratio is variably adjustable. In order to adjust the compression ratio systems with variable connecting rod links are known which actuate an eccentrical adjustment arrangement of a connecting rod by hydraulically or mechanically actuatable switch valves.

A generic switch valve is known from DE 10 2012 112 461 A1. A capture element of the switch element described therein is arrestable by an interlocking ball and a spring in two switching positions, wherein the interlocking ball cooperates with two interlocking grooves that are configured in the capture element.

BRIEF SUMMARY OF THE INVENTION

This configuration of the known switch valve is complex and expensive to produce. Therefore, it is an object of the invention to provide an improved switch valve and a connecting rod with the improved switch valve.

The object is achieved by a switch valve for controlling a hydraulic fluid flow, the switch valve comprising: a capture element that is arranged in a valve housing and that is displaceable into a first switching position or a second switching position and interlockable by a spring loaded interlocking element in the first switching position or the second switching position, wherein a first hydraulic connection is connected with a relief connection in the first switching position and a second hydraulic connection is connected with the relief connection in the second switching position, wherein a switching travel of the capture element is limited, wherein the interlocking element is at least partially arranged in a recess of the capture element, and wherein the valve housing includes a first groove that is oriented in an axial direction and limited in the axial direction wherein the interlocking element is arranged axially movable in the first groove.

Advantageously embodiments and advantages of the invention can be derived from the dependent claims, the description and the drawing figures.

A switch valve for controlling a hydraulic fluid flow is proposed, the switch valve comprising a capture element that is arranged in a valve housing and that is optionally displaceable into a first switching position or a second switching position and interlockable by a spring loaded interlocking element in the first switching position or the second switching position. Thus, a first hydraulic connection is connected with a relief connection in the first switching position and a second hydraulic connection is connected with the relief connection in the second switching position, wherein a switching travel of the capture element is limited.

According to the invention the interlocking element is at least partially arranged in a recess of the capture element, wherein the valve housing includes an axially defined first groove oriented in an axial direction wherein the interlocking element is arranged in the first groove axially movable.

The switch valve according of the invention includes a capture element that is arranged in a valve housing wherein the capture element is displaceable into a first switching position or a second switching position and interlockable by a spring loaded interlocking element in the first switching position or the second switching position. Like in known switch valves a first hydraulic connection of the switch valve can be advantageously connected in the first switching position with a first hydraulic chamber of a connecting rod and with a relief connection of the switch valve that can lead to a relief conduit of the connecting rod. In the second switching position the second hydraulic connection that can lead to a second hydraulic chamber of the connecting rod can be connected with the relief connection which can lead to the relief conduit. Thus, the switching travel of the capture element is limited.

Thus, the valve housing includes a first axial groove according to the invention in which the interlocking element is arranged axially movable in order to limit the switching travel and to provide rotation safety for the capture element. At least partially arranging the capture element in the recess is advantageous since a support length of the movable capture element can be significantly increased compared to the known switch valves. A propensity for wedging and self-hemming can be reduced and safely reaching the end positions under own power can be improved. Furthermore the spring configuration is non-critical due to increased installation length compared to what is known in the art. The interlocking element can be additionally used as stop element which can thus be omitted as an additional component. Advantageously the functions of the interlocking element and the stop element are combined in one component in the switch valve according to the invention. Thus, only one borehole for receiving the interlocking element and a switching channel for conducting the hydraulic fluid flow have to be provided between the hydraulic connections and the relief connection. This facilitates simpler fabrication of the capture element and more room is available for optimizing sealing distances in the switch valve since more free surface area is provided at the outer circumference of the switch valve. Advantageously the interlocking element can be at least partially arranged in a recess of the capture element that is configured transversal to the displacement direction of the capture element. In particular a spring that is arranged in an interior of the interlocking element can be provided for loading the interlocking element with a spring force.

According to an advantageous embodiment the interlocking element can cooperate with an interlocking contour element that is arranged in or at the valve housing. The interlocking contour that is required for interlocking the capture element in the switching positions is therefore arranged at a separate component and not at the capture element as done in the prior art so that the capture element can be produced in a much simpler and more economical manner. Thus, the interlocking contour element is another separate component that is configured in a rather simple manner so that it can be fabricated easily.

According to an advantageous embodiment the interlocking element can be configured axially movable together with the capture element. The interlocking element can be advantageously provided at least partially integrated into the capture element so that the capture element and the interlocking element can be moved in the axial direction together. The integration of the interlocking element into the capture element advantageously simplifies assembly of the switch valve.

According to an advantageous embodiment the interlocking contour element can be arranged in the portion of the first groove. This way the interlocking contour element can be advantageously arranged adjacent to the interlocking element which facilitates a cooperation of the interlocking element and the interlocking contour element. Thus, a smaller stroke of the spring loaded interlocking element and thus a quick switching of the switch valve can be provided.

According to an advantageous embodiment the interlocking contour element can have at least two interlocking positions for the interlocking element. Thus, two switching positions of the switch valve can be advantageously implemented in which the interlocking element is interlocked in the interlocking positions. An interlocking contour that is configured in the interlocking contour element can separate the two interlocking positions from each other reliably.

According to an advantageous embodiment the valve housing can includes a second groove in the portion of the first groove wherein the interlocking contour element is arranged in the second groove. The valve housing can include a second groove in a portion of the first groove that is configured as an axial groove wherein the second groove is configured at an outer contour so that the interlocking contour element is arranged therein and the second groove advantageously extends with its axial length beyond the first groove. The interlocking contour element is inserted into the second groove before mounting the switch valve so that a reaction of the spring preload that represents a contact force between the interlocking element and the interlocking contour element is only received in installed condition by a connecting rod bore hole that receives the valve housing. The second groove advantageously secures the interlocking contour element against displacement. Complex attachment measures for the interlocking contour element are therefore not required.

According to an advantageous embodiment the interlocking element can include a spring that is arranged in an interlocking sleeve. This way a spring loaded interlocking element can be easily provided since sufficient installation space is provided for a compression spring. The interlocking sleeve can be advantageously arranged in a recess of the capture element so that sufficient space is provided for the spring to relax. Thus, a preload of the compression spring can be set with sufficient precision in order to provide an advantageous function of the interlocking element. The spring can penetrate an interior of the interlocking sleeve when the interlocking sleeve is compressed. Thus, the interlocking element can follow an interlocking contour of the interlocking element while moving under spring tension in the first groove.

According to an advantageous embodiment the interlocking sleeve can be movably arranged in the recess of the capture element and while being preloaded by the spring. Thus, the interlocking sleeve can be pushed into the recess of the capture element when compressing the spring and can slide out of the recess again when the spring expands. Thus, the interlocking element can follow an interlocking contour of the interlocking element.

According to an advantageous embodiment the recess can include a stop for the interlocking sleeve. Thus, a penetration of the interlocking sleeve into the capture element can be limited which provides a defined force setting for the interlocking element.

According to an advantageous embodiment the interlocking contour element can extend over at least a length of the first groove of the valve housing. This assures that the interlocking contour element covers an entire length of the movement path of the interlocking element in the first groove of the capture element so that the interlocking element is supported reliably.

According to an advantageous embodiment the interlocking contour element can be loosely inserted into the second groove. In this case the spring preload is advantageously reacted only in the installed condition by a connecting rod bore hole that receives the valve housing which facilitates the assembly of the switch valve. However, it is also possible to alternatively press the interlocking contour element into the second groove.

According to an advantageous embodiment a preload of the spring can be generatable by the interlocking contour element in a correctly assembled condition. The interlocking contour element can press for example against the interlocking element with the spring when the valve housing with the interlocking contour element is inserted until the interlocking contour element is fixed in its installed condition and the spring of the interlocking element reaches the desired preload.

According to an advantageous embodiment the interlocking sleeve can be configured as a deep drawn component. Thus the interlocking sleeve can be fabricated in a simple and cost effective manner. The deep drawing method also provides great freedom of shaping a tip of the interlocking sleeve.

According to an advantageous embodiment the interlocking contour element can be configured as a stamped component. Stamping is a cost effective fabrication method for the interlocking contour element and provides the necessary freedom for shaping the component. Alternatively stamping and embossing can be used as a fabrication method for the interlocking contour element.

According to another aspect of the invention a connecting rod is proposed for an internal combustion engine with variable compression with an eccentrical element adjustment arrangement for adjusting an effective connecting rod length wherein an adjustment travel of the eccentrical element adjustment arrangement is adjustable by a switch valve. The eccentrical element adjustment arrangement advantageously includes an eccentrical element that cooperates with an eccentrical element lever and two pistons that are respectively movably supported in a hydraulic chamber wherein eccentrical element rods of the eccentrical element adjustment arrangement that engage the eccentrical element lever are supported at the two pistons. Changing the adjustment travel changes the effective connecting rod length. This facilitates controlling the compression of the internal combustion engine. A connecting rod of this type can include an eccentrical element adjustment arrangement that is provided in particular for shifting the actuation pistons to achieve a variable compression of the internal combustion engine.

A rotation of the adjustable eccentrical element adjustment arrangement is initiated by an impact of mass and load forces of the internal combustion engine that impact the eccentrical element adjustment arrangement during an operating stroke of the internal combustion engine. Effective directions of forces that impact the eccentrical element adjustment arrangement change continuously during an operating stroke. A rotation movement or adjustment movement is supported by pistons that are integrated in the connecting rod and loaded by hydraulic fluid, in particular motor oil. The pistons prevent a resetting of the eccentrical element adjustment arrangement due to varying force effective directions of forces that impact the eccentrical element adjustment arrangement.

The pistons are movably arranged in hydraulic chambers and loaded with hydraulic fluid through hydraulic fluid conduits. This prevents a flow of the hydraulic fluid from the hydraulic chambers back into the hydraulic fluid conduits. The hydraulic fluid conduits that are connected with the hydraulic chambers cooperate at least partially with the switch valve according to the invention.

According to an advantageous embodiment the eccentrical element adjustment arrangement can include at least two hydraulic chambers wherein the first hydraulic chamber is connected with a relief conduit in the first switching position of the switch valve and the second hydraulic chamber is connected with the relief conduit in the second switching position of the switch valve. The relief conduit establishes a connection with a hydraulic fluid supply of the connecting rod, e.g. through a groove in a crank bearing eye of the connecting rod.

BRIEF DESCRIPTION OF THE DRAWINGS

Further advantageous embodiments and improvements can be derived from the subsequent figures. The details and features that can be derived from the figures are not limited to the embodiments illustrated in the figures. Rather one or plural features can be combined with one or plural features from the description provided supra to form new embodiments. In particular the subsequent descriptions do not define limitations of the scope of the invention but they describe individual features and their possible cooperation, wherein:

FIG. 3 illustrates the switch valve according to FIG. 2 in a longitudinal sectional view;

FIG. 4 illustrates the switch valve according to FIG. 2 in a cross sectional view;

FIG. 7 illustrates the interlocking contour element of the switch valve in an isometric view;

FIG. 8 illustrates the capture element of the switch valve in an isometric view; and FIG. 9 illustrates the capture element of FIG. 8 rotated in the longitudinal direction by 90°.

DETAILED DESCRIPTION OF THE INVENTION

Figure 1:
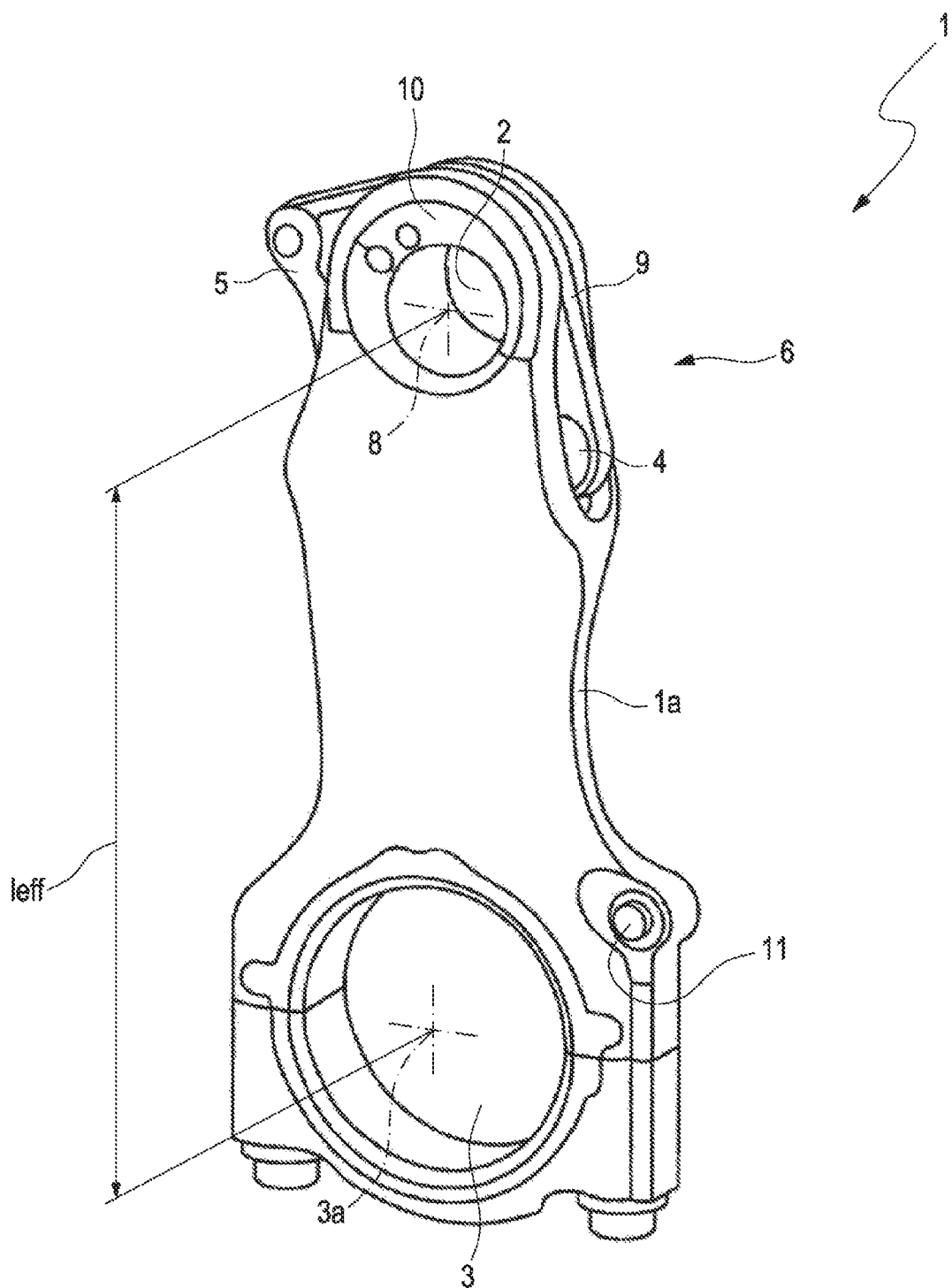
FIG. 1 illustrates a connecting rod according to invention in an isometric view.

In the drawing figures identical or like components are designated with identical reference numerals. The drawing figures merely show embodiments and do not limit the spirit and scope of the invention.

FIGS. 2-9 illustrated two different embodiments and sectional views of the switch valve 11 according to the invention or of individual components of the switch valve 11 which is provided in particular for a known connecting rod 1 illustrated in FIG. 1 for a variable compression internal combustion engine. The connecting rod 1 illustrated in FIG. 1 includes a connecting rod 1a and an adjustable eccentrical element adjustment arrangement 6 with an eccentrical element 10 that is at least partially arranged in a connecting rod bearing eye 2. The eccentrical element adjustment arrangement 6 is used for adjusting an effective connecting rod length leff. A distance of a center axis 3a of a crank bearing eye 3 from a center axis 8 of the connecting rod bearing eye 2 is defined as the connecting rod length leff.

A rotation of the adjustable eccentrical element adjustment arrangement 6 is initiated by an impact of mass and load forces of the internal combustion engine that become active during an operating stroke of the internal combustion engine upon the eccentrical element adjustment arrangement 6. During an operating stroke effective directions of forces impacting the eccentrical element adjustment arrangement 6 change continuously. The rotating movement or adjustment movement is supported by pistons that are loaded with hydraulic fluid, in particular with motor oil and that are integrated in the connecting rod 1 and not illustrated. Thus, the pistons prevent a resetting of the eccentrical element adjustment arrangement 6 due to varying force effective directions of forces that impact the eccentrical element adjustment arrangement 6.

The pistons are operatively connected by eccentrical element rods 4, 5 on both sides with an eccentrical element 9 of the eccentrical element adjustment arrangement 6. The pistons are movably arranged in hydraulic chambers and loaded through non-illustrated hydraulic fluid conduits from the crank bearing eye 3 with hydraulic fluid through non-illustrated check valves. The check valves prevent a flow back of the hydraulic fluid from the hydraulic chambers into the hydraulic fluid conduits into a bearing shell of the crank bearing eye 3 and facilitate pulling hydraulic fluid into the hydraulic chambers. The hydraulic fluid conduits that are connected with the hydraulic chambers cooperate at least partially with the check valve 11 according to the invention. In a first switching position S1 of the switch valve 11 the first hydraulic chamber is connected with a non-illustrated relief conduit and in the second switching position 32 of the switch valve 11 the second hydraulic chamber is connected with the relief conduit. Thus, the relief conduit establishes a connection to a hydraulic fluid supply of the piston 1 e.g. through a groove in the crank bearing eye 3 of the connecting rod 1.

The subsequently described switch valve 11 can also be used for any other connecting rod of a variable compression internal combustion engine which includes an eccentrical element adjustment arrangement 6 for adjusting an effective connecting rod length and at least two hydraulic chambers. For example, the eccentrical element adjustment arrangement 6 of the connecting rod can be configured with a so called pivot motor system.

Figure 2:
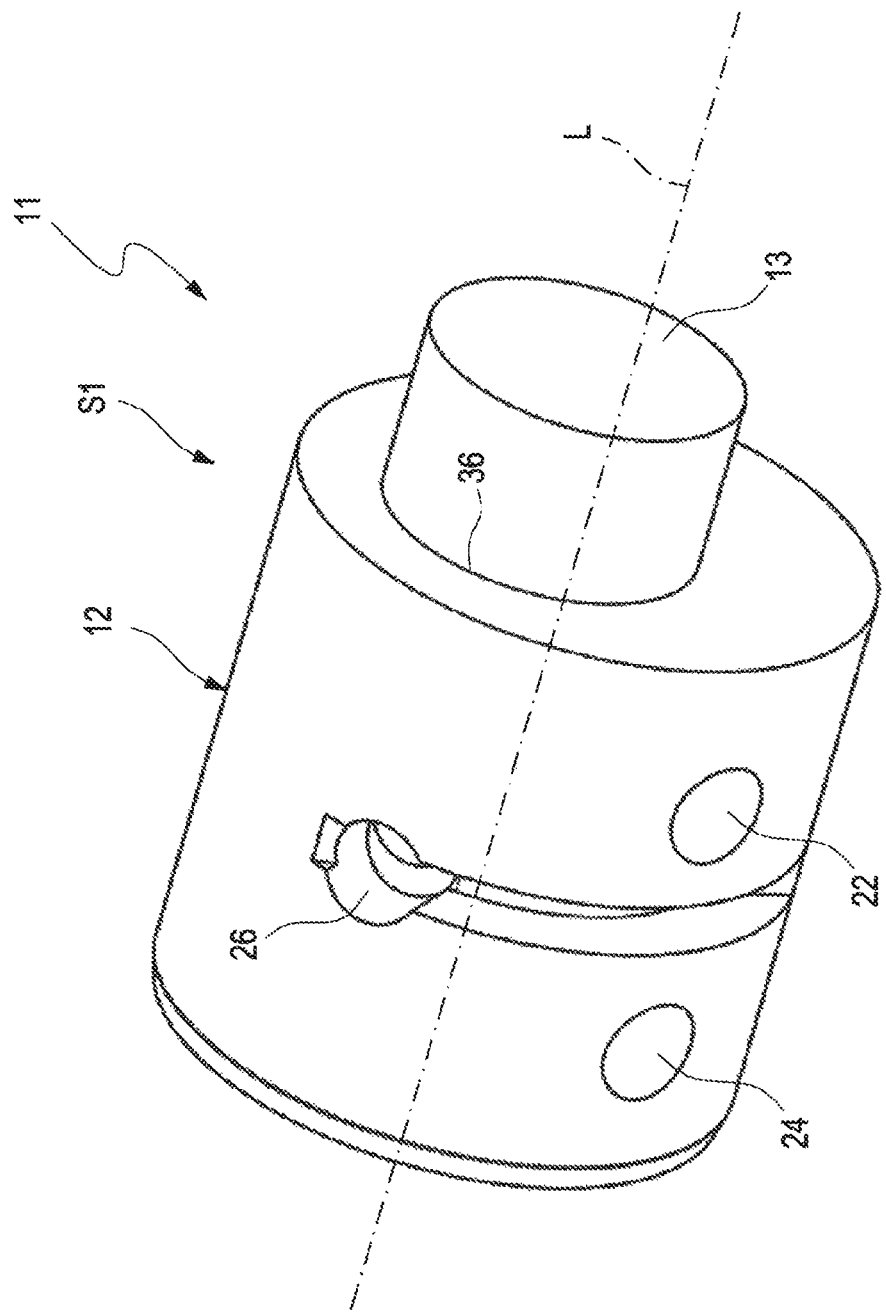
FIG. 2 illustrates a switch valve according to an embodiment of the invention in an isometric view.

FIG. 2 illustrates a switch valve 11 according to an embodiment of the invention in an isometric view. The switch valve 11 includes a capture element 13 that is arranged in a valve housing 12 and that is displaceable in an axial direction L into a first switching position S1 (illustrated in FIG. 2) or a second switching position S2 (illustrated in FIG. 3) and arrestable by a spring loaded interlocking element 14 optionally in the first switching position S1 or in second switching position S2. Thus, a first hydraulic connection 22 of the switch valve 11 is connected in the first switching position S1 with a relief connection 26 and in the second switching position S2 a second hydraulic connection 24 is connected with the relief connection 26. Like in known switch valves the first hydraulic chamber of the connecting rod 1 is connected with the relief conduit in the first switching position S1 and in the second switching position 32 the second hydraulic chamber of the connecting rod 1 is connected with the relief conduit.

As evident in particular from FIG. 3 which illustrates a longitudinal sectional view of the switch valve 11 according to the invention the capture element 13 that is arranged in the valve housing 12 is interlockable in the first switching position S1 or the second switching position S2. According to the invention the interlocking element 14 and the spring 15 arranged in the interlocking element 14 are at least partially arranged in a transversal recess 16 of the capture element 13, wherein the valve housing 12 includes a first groove 17 that is oriented in an axial direction L and defined in the axial direction wherein the interlocking element 14 is arranged axially movable in the groove to define the shift travel and to provide rotation safety for the capture element 13. The at least partial arrangement of the capture element 14 in the recess 16 is advantageous since the support length of the movable interlocking element 14 can be significantly increased compared to known switch valves. A propensity for wedging and self-hemming can be reduced and safely reaching end positions under own power can be improved. Furthermore, the engineering design for the spring is non-critical since the installed length of the spring is much greater than according to the prior art.

The interlocking element 14 is additionally used as a stop element which can thus be omitted as an additional component. The interlocking element 14 is provided axially movable together with the interlocking element 14.

The interlocking element 14 cooperates with an interlocking contour element 18 with an interlocking contour 19 that is illustrated in FIG. 7 as an individual component that is arranged in or at the valve housing 12. The interlocking contour 19 that is necessary for the switching positions S1, 32 is thus not provided like according to the prior art at the capture element 13 but at a separate component, so that the capture element 13 is producible in a much simpler and cost effective manner. The interlocking contour element 18 can also be produced in a simple and cost effective manner e.g. as a stamped component. The interlocking contour element 18 advantageously includes at least two interlocking positions 28, 30 for the interlocking element 14 which implement the two switching positions S1 and 82 of the switch valve 11 by moving the capture element 13.

As illustrated in FIG. 3 in a longitudinal sectional view of the switch valve 11 the interlocking element 14 includes a spring 15 that is arranged and supported in an interlocking sleeve 32 and that can be easily arranged in the provided installation space. Due to the shape of the interlocking sleeve 32 the spring 15 can contact the interlocking sleeve in a contact point. In order to facilitate the interlocking function, the interlocking sleeve 32 is movable in the recess 16 of the capture element 13 and arranged preloaded by the spring 15. The recess 16 includes a stop 34 for the interlocking sleeve 32 so that the movement travel of the interlocking element 14 is limited. The interlocking sleeve 32 can thus be advantageously and economically configured as a deep drawn component.

Figure 5:
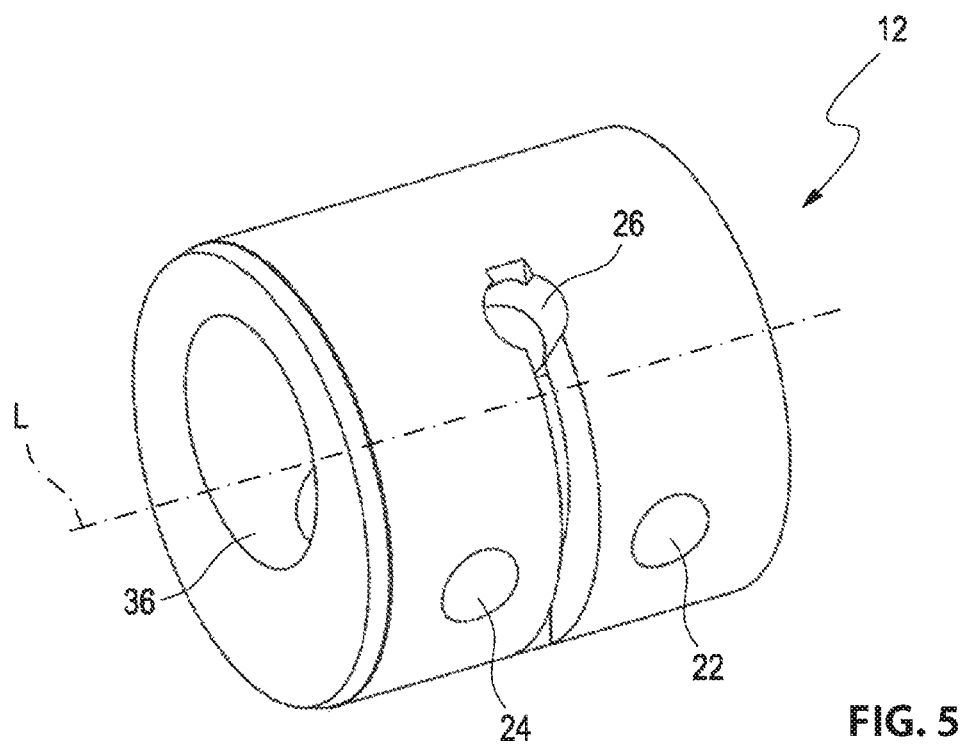
FIG. 5 illustrates the valve housing of the switch valve of FIG. 2 in an isometric view.
Figure 6:
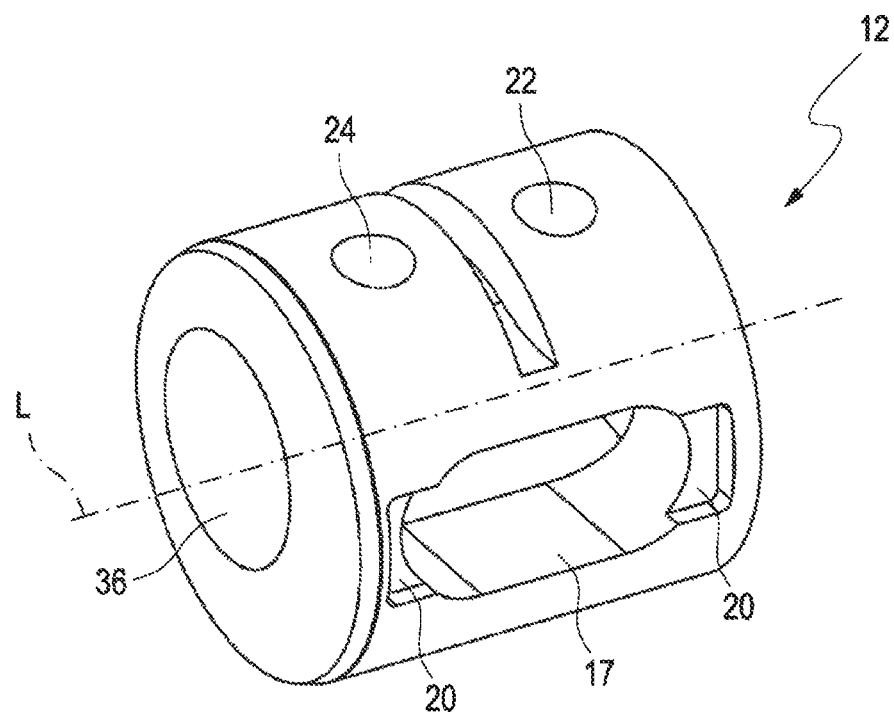
FIG. 6 illustrates the valve housing of FIG. 5 rotated by 90° in the longitudinal direction.

FIGS. 5 and 6 illustrate the valve housing of the switch valve 11 according to FIG. 2 in an isometric view respectively rotated in the longitudinal direction L by 90°, As evident in FIG. 5 the valve housing 12 includes a first hydraulic connection 22 and a second hydraulic connection 24 that are symmetrically arranged relative to a relief connection 26. The two hydraulic connections 22, 24 are configured as bore holes, whereas the relief connection 26 is configured as a bore hole that is connected by a slot. Moving the capture element 13 that is arranged in the valve housing 12 facilitates establishing a hydraulic connection between one of the two hydraulic connections 22, 24 and the relief connection 26 in the two switching positions S1 and S2 by a switching channel 38 that is arranged on an outer circumference of the capture element 13.

The valve housing 12 illustrated in FIG. 6 includes a second groove 20 at its outer contour in a portion of the first groove 17 that is configured as an axial groove, wherein the interlocking contour element 18 is arranged in the second groove and wherein the second groove extends with its axial length beyond the first groove 17 in order to reliably cover an entire length of the first groove 17. The interlocking contour element 18 is only loosely inserted into the groove 20 before mounting the switch valve 11 so that the spring preload (contact force between the interlocking element 14 and the interlocking contour element 18) is only taken over in installed condition by a connecting rod bore hole that receives the valve housing 12. Thus, the preload of the spring 15 is only generated by the interlocking contour element 18 in an assembled condition. The second groove 20 secures the interlocking contour element against linear movement. Thus, complicated attachment measures for the interlocking contour element 18 are not required.

It is an additional advantage that the sealing paths of the hydraulic fluid channels in the switch valve 11 can be increased by combining the functions of the interlocking element and the stop element. The hydraulic fluid channels for the reliefs can also be simplified significantly.

FIG. 7 illustrates the interlocking contour element 18 of the switch valve 11 in an isometric view. The interlocking contour element 18 that can be configured for example as a stamped component includes a central interlocking contour 19 that separates the two interlocking positions 28, 30 from one another. The interlocking positions 28, 30 can be configured as flat portions of the interlocking contour element 18 on both sides of the interlocking contour 19 as illustrated. Alternatively, the interlocking positions can also be provided as recesses in the interlocking contour element 18. With an interlocking contour element 18 of this type a control curve that is advantageous for the interlocking function can be advantageously provided.

FIGS. 8 and 9 illustrate the capture element 13 of the switch valve 11 in an isometric view respectively rotated relative to each other by 90° in the longitudinal direction. FIG. 8 illustrates a recess 16 that is configured as a central bore hole in the capture element 13 into which the interlocking element 14, in particular the interlocking sleeve 32 with the spring 15 is insert able. FIG. 9 illustrates a T-shaped switching channel 38 on an outer circumference of the capture element 13, wherein the switching channel respectively hydraulically connects the first hydraulic connection 22 or the second hydraulic connection 24 with the relief connection 26 when moving the capture element 13 in the valve housing 12 into the switching positions S1 and S2.

What is claimed is:

1. A switch valve for controlling a hydraulic fluid flow, the switch valve comprising:
    a capture element that is arranged in a valve housing and that is displaceable into a first switching position or a second switching position in an axial direction of the valve housing and interlockable by a spring loaded interlocking element in the first switching position or the second switching position,
    wherein a first hydraulic connection is connected with a relief connection in the first switching position and a second hydraulic connection is connected with the relief connection in the second switching position,
    wherein a switching travel of the capture element is limited,
    wherein the interlocking element is at least partially arranged in a recess of the capture element, and
    wherein the valve housing includes a first groove that is oriented in the axial direction of the valve housing, has flat straight walls oriented in the axial direction of the valve housing, extends through a circumferential valve housing wall in a direction that is parallel to a radial direction of the valve housing, has a length in the axial direction and that is closed on both ends in the axial direction of the valve housing, and
    wherein the interlocking element is arranged axially movable relative to the valve housing in the axial direction of the valve housing in the first groove and in direct contact with the flat straight walls of the first groove.

2. The switch valve according to claim 1, wherein the interlocking element cooperates with an interlocking contour element which is fixed at the valve housing.

3. The switch valve according to claim 1, wherein the interlocking element is axially movable together with the capture element.

4. The switch valve according to claim 2, wherein an interlocking contour element is arranged in a portion of the first groove.

5. The switch valve according to claim 2, wherein an interlocking contour element includes at least two interlocking positions for the interlocking element.

6. The switch valve according to claim 2,
    wherein the valve housing includes a second groove in a portion of the first groove,
    wherein the interlocking contour element is arranged in the second groove.

7. The switch valve according to claim 1, wherein the interlocking element includes a spring that is arranged in an interlocking sleeve.

8. The switch valve according to claim 7, wherein the interlocking sleeve is movably arranged in the recess of the capture element and preloaded by the spring.

9. The switch valve according to claim 7, wherein the recess includes a stop for the interlocking sleeve.

10. The switch valve according to claim 2, wherein the interlocking contour element extends over at least a length of the first groove of the valve housing.

11. The switch valve according to claim 2, wherein the interlocking contour element is arranged in a second groove with a clearance.

12. The switch valve according to claim 7, wherein a preload of the spring is generated by the interlocking contour element.

13. The switch valve according to claim 7, wherein the interlocking sleeve is configured as a deep drawn component.

14. The switch valve according to claim 2, wherein the interlocking contour element is configured as a stamped component.

15. A connecting rod for a variable compression internal combustion engine with an eccentrical element adjustment arrangement for adjusting an effective connecting rod length, wherein the hydraulic fluid flow is adjustable by the switch valve according to claim 1.

16. The connecting rod according to claim 15,
    wherein the eccentrical element adjustment arrangement includes at least two hydraulic chambers, and
    wherein the first hydraulic chamber is connected with a relief conduit in a first switching position of the switch valve and the second hydraulic chamber is connected with the relief conduit in a second switching position of the switch valve.

* * * * *